United States Patent [19]

Neff et al.

[11] Patent Number: 4,957,065
[45] Date of Patent: Sep. 18, 1990

[54] PULSATION SELECTOR

[75] Inventors: Clayton Neff, Shawnee; Mofazzal H. Chowdhury, Lenexa, both of Kans.

[73] Assignee: Alfa-Laval Agri Inc., Kansas City, Mo.

[21] Appl. No.: 423,985

[22] Filed: Oct. 19, 1989

Related U.S. Application Data

[63] Continuation-in-part of Ser. No. 180,526, Apr. 12, 1988, abandoned.

[51] Int. Cl.$^5$ ............................................. A01J 5/10
[52] U.S. Cl. ............................ 119/14.37; 119/14.55
[58] Field of Search ............... 119/14.32, 14.34, 14.37, 119/14.38, 14.39, 14.54, 14.55

[56] References Cited

U.S. PATENT DOCUMENTS

| | | | |
|---|---|---|---|
| 2,694,380 | 11/1954 | Harstick | 119/14.55 |
| 3,209,727 | 10/1965 | Fukutome | 119/14.37 |
| 3,810,443 | 5/1974 | Bodmin | 119/14.37 |
| 4,280,445 | 7/1981 | Phillips | 119/14.37 X |
| 4,365,589 | 12/1982 | Phillips et al. | 119/14.55 X |
| 4,807,566 | 2/1989 | Chowdhury | 119/14.55 |

Primary Examiner—Robert P. Swiatek
Assistant Examiner—T. Manahan
Attorney, Agent, or Firm—Davis Hoxie Faithfull & Hapgood

[57] ABSTRACT

A pulsation selector for milking machines is adjustable to enable alternate milking between the front and rear or between the right and left teats of the animal.

8 Claims, 3 Drawing Sheets

PULSATION SELECTOR

This application is a continuation-in-part of my co-pending application Ser. No. 180,526 filed Apr. 12, 1988, now abandoned.

This invention relates to a pulsation selection device or pulsation selector for automatic milking machines and in particular to a device which can be adjusted quickly and easily by the dairyman to provide pulsation alternating between the front and back teats of the animal being milked or between the left and right teats.

In modern automatic milking machines teat cups comprising an outer shell, usually of metal, and an inner liner of rubber or other elastic material are placed on the teats of the animal to be milked. The bottom of each teat cup liner is provided with a tube which connects, via a milk claw to a vacuum line through which milk is drawn off. The side of the teat cup is provided with a nipple communicating with the intermediate space between the teat cup and the liner. This nipple is connected to a device usually mounted on the milk claw, which applies air or vacuum to the intermediate space to press the liner against the teat, thus massaging the teat, or to hold the liner away from the teat, permitting milk to be extracted.

Various systems have been developed for alternating the pulsation sequence. In the simplest system, all the teats of the animal are subjected to air pressure or vacuum at the same time; thus all are massaged or milked simultaneously. For various reasons, most dairymen prefer to alternate vacuum and air pressure on two teats at a time, i.e., to massage two teats while the others are being milked and then milk the first two while the second two are massaged. Beyond that dairymen have a preference with respect to whether the alternation should be between the left and right teats or between the front and rear teats; often it is desirable to change from one sequence to the other. Thus it is desirable to have a means for shifting from a fore and aft alternation to a side to side alternation and back again.

In accordance with the present invention a pulsation selector is provided which enables the dairyman, with minimal effort, to switch from one mode of alternation to the other.

A pulsation selector according to the invention comprises a housing, a connecting chamber in said housing running around the circumference of the housing, four outlet tubes arranged around the housing and communicating with the connecting chamber, two inlet tubes communicating with said chamber on opposite sides the housing and a closure for the chamber, said closure having a partition extending into and across the chamber and dividing the chamber into two sections, one section connecting one of said inlet tubes with two of said outlet tubes and the other section connecting the other inlet tube to the remaining outlet tubes, said closure and its partitions being rotatable to connect said inlet tubes to different sets of outlet tubes.

The invention will be further described with reference to the accompanying drawing in which.

Figure 1:
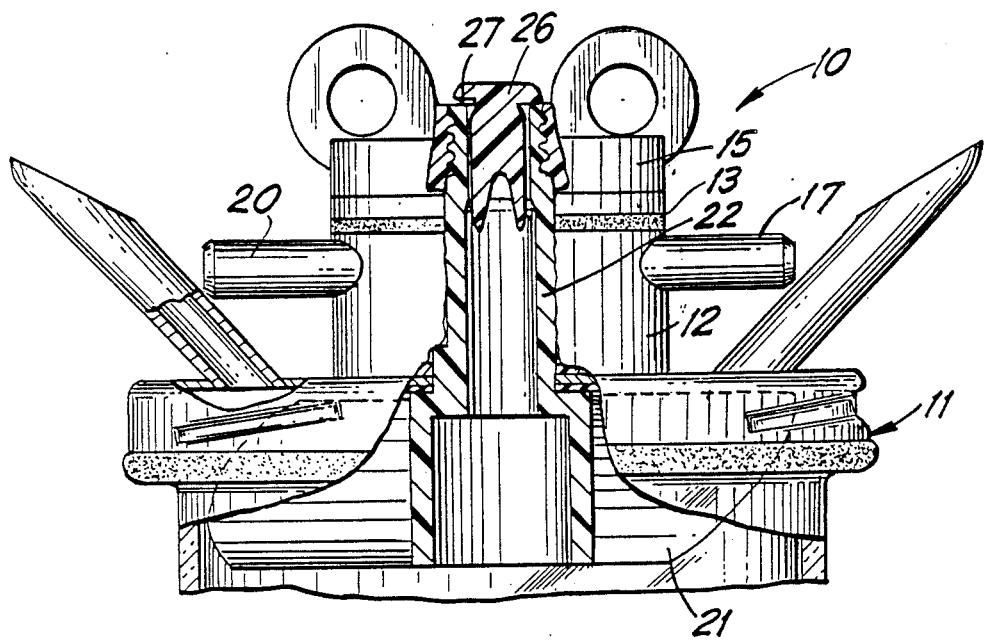
FIG. 1 shows a milk claw having mounted thereon a pulsation selector according to the invention.

Referring to FIG. 1 a pulsation selector 10 according to the invention, is shown mounted as a turret on top of a milk claw 11 of the type shown in my co-pending application Ser. No. 104,154, filed Oct. 5, 1987, now abandoned. Obviously the device may be used with claws of other types. It is also possible to position the device apart from the claw, though current practice in automatic milking machinery is to make the pulsation device a part of the claw.

Figure 2:
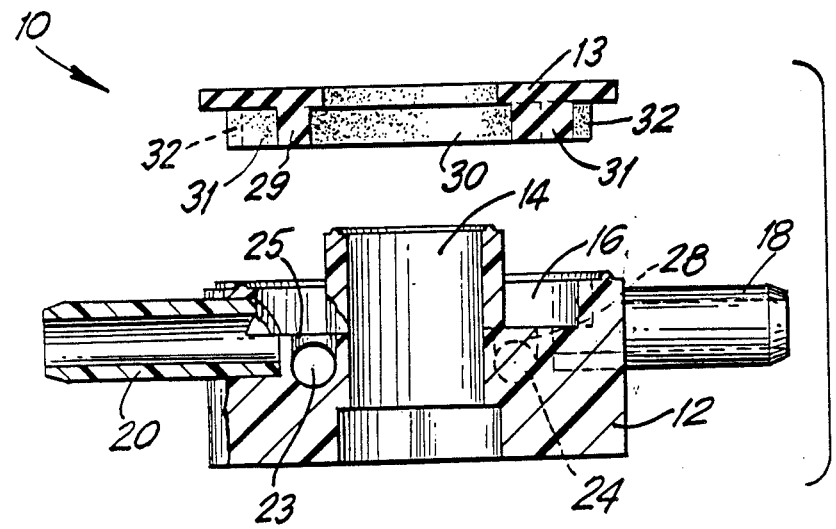
FIG. 2 is an exploded view in vertical section of a pulsation selector according to the invention.

As shown in FIG. 2 the pulsation selector 10 comprises a housing 12 and a closure which takes the form of a cover 13. The housing may be made of corrosion resistant metal such as monel or stainless steel or of a plastic, for example an acrylic resin or nylon. The cover 13 is preferably flexible. It may be made of rubber or a synthetic elastomer, for example, an EPDM such as Nordel. The housing shown in the drawings is cylindrical but obviously may be made in various other configurations. It is provided with a central socket 14 which is shaped to fit over the central shaft 22 of the flow separator 21 of the claw 11. The selector is provided with a cap 15, which as shown in FIG. 1, is threaded onto the end of shaft 22 to retain the selector 10 on the claw 11. The shaft 22 is hollow and communicates with the interior of the claw. A valve block 26 having a small vent hole 27 is provided in the upper end of shaft 22 in accordance with the conventional practice.

Figure 3:
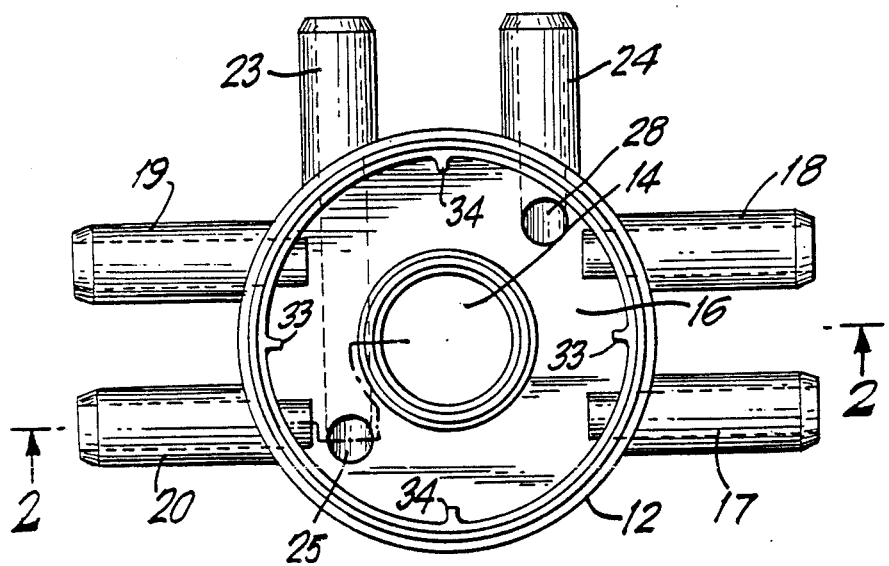
FIG. 3 is a plan view of the housing of the selector of FIG. 2.

The selector 10 has an annular connecting chamber 16 which extends around the circumference of the housing. Four outlet tubes 17, 18, 19, 20 (FIGS. 2 and 3) are provided communicating with the connecting chamber 16. Two inlet tubes 23, 24 are also provided below the connecting chamber 16. Inlet tube 23 extends from one side of the housing to the opposite side and communicates with the connecting chamber 16 through a short conduit 25 which extends upwardly from tube 23 to the chamber. Inlet tube 24 is in communication with chamber 16 through a short conduit 28 which extends upwardly from the end of tube 24.

Figure 4:
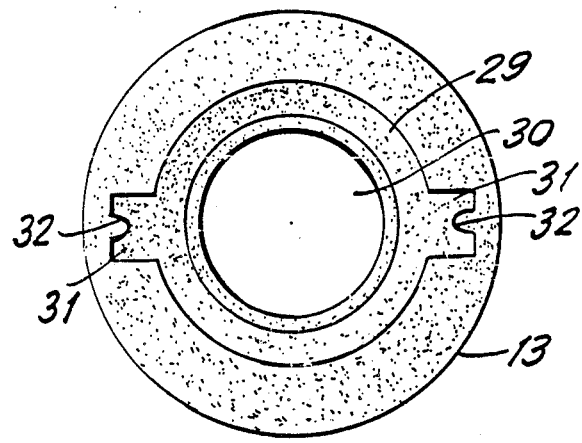
FIG. 4 is a bottom view of the cover of the selector of FIG. 2.

The cover 13, as shown in FIGS. 2 and 4, comprises a hub 29 which has a central aperture 30. The hub 29 fits in the connecting chamber 16 with the inner wall of the hub bearing against the inner wall of the chamber. A partition 31 extends on opposite sides of the hub 29 and across the connecting chamber 16, dividing the chamber into two sections. Notches 32 are formed in the ends of the partition 31 and engage projections 33 for projections 34 on the outer wall of the connecting chamber 16 to keep the cover in predetermined orientation with respect to the housing.

In operating the inlet tubes 23 and 24 are connected to a source (not shown) designed to supply alternately vacuum and air to each of the inlet tubes, i.e., to supply vacuum to tube 24 when air is supplied to tube 23 and vice versa. The outlet tubes 7, 18, 19, 20 are connected by suitable tubing to the outer chambers of four teat cups (not shown) which are attached to the four teats of the animal being milked.

Assume now, for sake of explanation, that outlet tubes 18 and 19 are attached to the right and left front teats of the animal, respectively, and outlet tubes 17 and 20 are connected with the right and left rear teats. With the cover positioned as indicated in FIGS. 2 and 4, i.e., with the partition 31 in the 9 o'clock/3 o'clock orientation, the notices 32 being engaged with projections 33, inlet tube 23 will be in communication with the rear teats and inlet tube 24 with the front teats. Thus the front and rear teats may be alternatively milked and massaged.

If now the cover 13 is lifted up and rotated 90° so that partition 31 is in the 12 o'clock/6 o'clock orientation, the notches 32 being engaged with projections 34, inlet tube 23 will be in communication with the left hand teats and inlet tube 23 with the right hand teats. Thus the left and right teats can be alternately milked and massaged.

Figure 5:
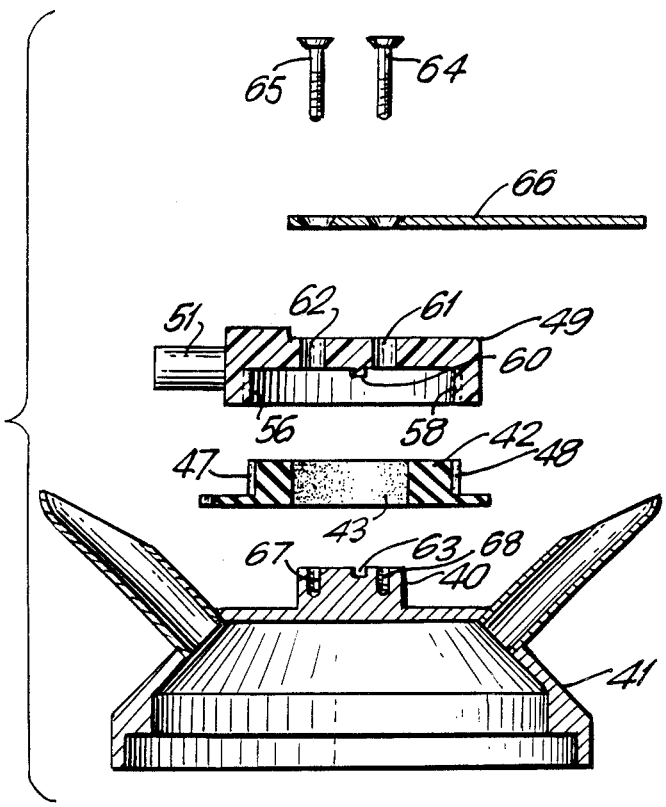
FIG. 5 is an exploded schematic view of a portion of a milk claw with an alternative design of a selector according to the invention.
Figure 7:
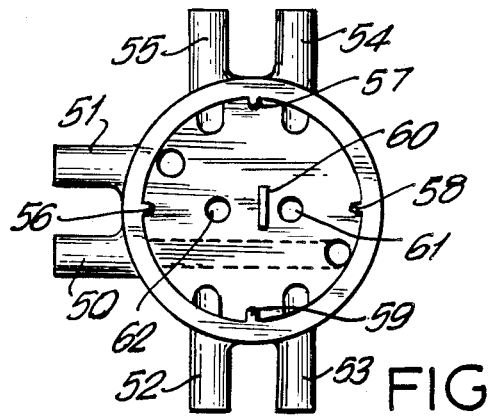
FIG. 7 is a schematic bottom view of the housing of the selector of FIG. 5.
Figure 6:
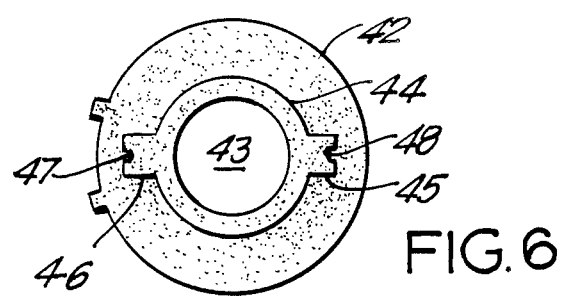
FIG. 6 is a schematic plan view of the selector base in the embodiment of FIG. 5.

An alternative design which may be preferred in many instances is shown in FIGS. 5-7. Referring to FIG. 5, a cylindrical knob 40 is provided on top of a milk claw 41. A closure, which takes the form of a base 42 having a central orifice 43 fits over the knob 40. As shown more clearly in FIG. 6 the base 42 has a central hub 44 with two side extensions 45, 46, each of which has a notch 47, 48 in its end. A housing 49 fits over the base 42, and forms with the hub 44, an annular connecting chamber, with the side extensions 45, 46, forming a partition extending across the connecting chamber.

As shown in FIG. 7, the housing is constructed in a manner similar to the housing 12 of FIGS. 1-4. Two inlet tubes 50, 51 empty into opposite sides of the housing and four outlet tubes 52, 53, 54, 55 are arranged at 90 degrees to the inlet tubes on opposite sides of the housing at a different level from the inlet tubes. Projections 56, 57, 58, 59 are arranged at 90 degrees intervals around the interior of the housing. A locking stud 60 is provided internally of the housing and screw holes 61, 62 are provided in the housing cover.

As shown in FIG. 5 the selector is assembled by placing the base 42 over the knob 40 and then placing the housing 49 over the hub 44 of the base 42 so that the locking stud 60 engages in a slot 63 in the upper surface of hub 40 and projections 56, 58 engage in the notches 47, 48 in the side extensions 45, 46 of the hub 44. The parts are secured by screws 64, 65 which engage in tapped sockets 67, 68 in the hub 40. A hanger 66 may also be attached to the top of the housing by the screws 64, 65. When it is desired to rearrange the pressure/vacuum distribution pattern, the housing 49 is removed and the base 42 is rotated 90° The housing is then replaced with the projections 57, 58 engaging the notches 47, 48.

What is claimed is:

1. A pulsation selector for milking machines which comprises a housing, a connecting chamber in said housing around the circumference of said housing, a plurality of outlet tubes arranged around said housing and communicating with said chamber, two inlet tubes connecting to said chamber on opposite sides of said housing, and a closure for said chamber, said closure having a partition extending into and across said chamber dividing said chamber into two sections, one section connecting one of said inlet tubes to certain of said outlet tubes and the other section connecting the other inlet tube to others of said outlet tubes, said closure and its partition being rotatable, thereby to connect said inlet tubes to different sets of outlet tubes.

2. A pulsation selector for milking machines comprising a cylindrical turret adapted to be positioned on top of a milk claw, a connecting chamber in said turret, extending around the periphery of said turret, first, second, third and fourth outlet tubes connecting to said chamber extending outwardly of said turret for connection to the outer chambers of teat cups, first and second inlet tubes for connection to sources of vacuum and air, and connecting to said chamber at different sides of the turret, and a closure for said chamber, said closure having a partition extending from one face thereof into and across said chamber to divide said chamber into two sections, said closure being capable of a first orientation within said chamber in which said partition divides said chamber into a first section communicating with said first inlet tube and said first and second outlet tubes, and a second section communicating in the said second section and said third and fourth outlet tubes, and a second orientation in which said partitions divides said chamber into a first section communicating with said first inlet tube and said first and third outlet tubes and a second section communicating with said second inlet tube and said second and fourth outlet tubes, whereby by changing the orientation of said cover, pulsation can be alternated between the front and rear teats of an animal being milked or between the left and right teats of such animal.

3. The selector claimed in claim 2 and comprising means for securing said cover in said first and second orientations.

4. The selector claimed in claim 3 wherein said securing means comprises projections on the wall of said chamber and recesses on the ends of said partition.

5. The selector claimed in claim 2 wherein the inlet tubes are below the chamber and wherein the selector comprises conduits connecting the inlet tubes to the chamber.

6. A pulsation selector for milking machines comprising a base having a central hub, a housing on said base and forming with said base an annular connecting chamber, first, second, third and fourth outlet tubes connecting to said chamber and extending outwardly of said housing for connection to the outer chambers of teat cups, first and second inlet tubes for connection to sources of vacuum and air and connecting to said chamber at different sides of the housing, said central hub having a partition extending across said chamber to divide said chamber into two sections, said base and its hub being capable of a first orientation within said housing in which said partition divides said chamber into a first section communicating with said first inlet tube and said first and second outlet tubes and a second section communicating with said second inlet tube and said third and fourth outlet tubes; and a second orientation in which said partition divides said chamber into a first section communicating with said first inlet tube and said first and third outlet tubes and a second section communicating with said second inlet tube and said second and fourth outlet tubes, whereby by changing the orientation of said base, pulsation can be alternated between the front and rear teats of an animal being milked or between the left and right teats of such animal.

7. The selector claimed in claim 6 and comprising means for securing said base in said first and second orientation.

8. The selector claimed in claim 7 wherein the securing means includes projections on the inner walls of the housing and recesses on ends of the partition.

* * * * *